United States Patent [19]

Vitriol

[11] 3,920,584
[45] Nov. 18, 1975

[54] HIGH DIELECTRIC CONSTANT SCREENED CAPACITOR SYSTEM

[75] Inventor: William A. Vitriol, Brea, Calif.

[73] Assignee: Beckman Instruments, Inc., Fullerton, Calif.

[22] Filed: Aug. 6, 1973

[21] Appl. No.: 385,873

[52] U.S. Cl. .................. 252/514; 252/518; 252/521
[51] Int. Cl.² ........................................ H01B 1/02
[58] Field of Search ..................... 252/521, 518, 514

[56] References Cited
UNITED STATES PATENTS

| | | | |
|---|---|---|---|
| 3,684,536 | 8/1972 | Hoffman | 252/514 X |
| 3,741,780 | 6/1973 | Hoffman | 252/514 X |

Primary Examiner—Benjamin R. Padgett
Assistant Examiner—E. Suzanne Parr
Attorney, Agent, or Firm—R. J. Steinmeyer; W. A. Simons

[57] ABSTRACT

A novel electrode material and method of application adapted for use in production of high dielectric screened capacitors and other thick film components. The electrode material comprises a mixture of conductive material, such as noble metals or noble metal oxides, and $BaO:B_2O_3$ flux, deposited in the form of a paste upon a substrate and fired. The fired electrode layer exhibits excellent substrate adherence and does not degrade the dielectric characteristics of $BaTiO_3$ based dielectric materials as much as previously utilized silica based materials.

7 Claims, No Drawings

HIGH DIELECTRIC CONSTANT SCREENED CAPACITOR SYSTEM

BACKGROUND OF THE INVENTION

This invention relates to thick film capacitors and other electrical components. More specifically, the invention relates to a novel composition of electrode material and method of application especially adapted for use in manufacturing thick film electrical capacitors having high dielectric characteristics.

In the field of microelectronics, small layered electrical devices are formed utilizing a technique of screening electrode and/or dielectric materials upon substrates in the form of paste and then firing the paste to form a layer of the electrical device. Screened materials prepared in this fashion are relatively porous compared to the same materials when fabricated by another technique, such as pressing or extrusion. Consequently, particularly where screened dielectric layers are concerned, the dielectric characteristics of a screened layer are found to be considerably lower than the characteristics of a layer of similar material prepared by another fabrication process.

In view of the above-mentioned porosity, it has been difficult to fabricate small electrical capacitors having high dielectric characteristics by means of the screening technique. The difficulty in producing high dielectric screened capacitors is further enhanced in that the use of silica or silicate flux materials in conjunctioin with the commonly utilized $BaTiO_3$ based dielectrics has been found to depress the dielectric constant of the completed dielectric layer. Difficulties in utilizing other flux materials have been encountered in that they do not provide sufficient substrate adherence, and that the resulting electrode or dielectric material is not compatible with other circuit components, such as resistors, cross-overs and conductors contained upon the same substrate.

SUMMARY OF THE INVENTION

The present invention contemplates an electrode material which can be adapted for use in production of thick film, high dielectric capacitors utilizing $BaTiO_3$ based dielectric materials or other thick film electrical components. The electrode material comprises a mixture of conductive material, such as noble metals or noble metal oxides and $BaO:B_2O_3$ flux, which is deposited or screened in the form of a paste upon a substrate and fired.

The electrode material should contain a mixture within the range of 70–90% by weight noble metal and 10–30% by weight $BaO:B_2O_3$. The preferred amounts is about 85% by weight noble metals and about 15% by weight $BaO:B_2O_3$.

OBJECTS OF THE INVENTION

Accordingly, it is an object of the invention to provide a novel electrode material and method of application adapted for use in production of high dielectric screened capacitors.

It is another object of the invention to provide an electrode material and method which overcomes the problems outlined hereinbefore in the production of screened capacitors having high dielectric constant characteristics and other thick film electrical components.

It is a further object of the invention to provide a novel electrode material which utilizes boric oxide flux in conjunction with a mixture of conductive materials, such as noble metals or noble metal oxides.

It is yet another object of the invention to provide a novel electrode material which produces an electrode layer that is compatible with other circuit components, has good substrate adherence, and does not contaminate or depress the dielectric constant of $BaTiO_3$ and titanate based dielectric layers.

DETAILED DESCRIPTION OF THE INVENTION

A preferred embodiment of a method utilizing a $BaO:B_2O_3$ based electrode composition is described hereinafter that is especially useful in production of high dielectric screened capacitors on a substrate such as an aluminum substrate. The production of such capacitors involves screening of a base electrode layer upon the upper side of the substrate. The base electrode is formed of a high firing conductive material including noble metals or noble metal oxides. In the preferred embodiment the particular electrode formula utilized was Table I

| Element | % by Weight |
|---|---|
| Platinum | 23.80 |
| Gold | 35.70 |
| Palladium | 25.50 |
| $BaO:B_2O_3$ | 15.00 |

The $BaO:B_2O_3$ flux was utilized in a portion of 86.86% by weight, BaO to 13.14% by weight, $B_2O_3$.

The $BaO:B_2O_3$ is mixed as dried powder and melted at 1,500°C in a Pt crucible utilizing an induction heater. The molten glass then is poured into a bucket of water. The fritted glass, when removed from the water, is dried at 85°C and milled to a particle size less than 2 microns.

The metal components are prepared in a powder form and mixed with the $BaO:B_2O_3$ powder. This combination is blended with a screening vehicle comprising an organic binder and a solvent whereby a screenable paste is produced. A variety of conventional screening vehicles can be utilized.

The paste is deposited upon the desired areas of the substrate by screening, in a layer of predetermined thickness, and the screened layer is fired at about 2,400°F for 1½ hours to produce the finished base electrode.

A $BaTiO_3$ based dielectric paste is then screened on the base electrode and fired at a temperature of about 2,200°F for 1½ hours to form the dielectric layer of the capacitor. In the preferred embodiment, the dielectric formula utilized was Table II

| Compound | % by Weight |
|---|---|
| $BaTiO_3$ | 88.90 |
| $Bi_2O_3$ | 7.50 |
| $Nb_2O_5$ | 1.50 |
| $TiO_2$ | .90 |
| ZnO | 1.00 |

A top electrode is formed of a lower firing conductive material of conventional composition. The top electrode is fired at a temperature of up to 1,850°F for about one-half hour. Upon completion of the layering of the device, the substrate is tailored, by conventional means, to produce the desired outline.

The foregoing method and electrode composition have been utilized in production of small thick film capacitors having higher dielectric constants than were attainable utilizing silica containing electrode materials. Furthermore, the base electrode layer exhibits excellent substrate adherence and has been found to be compatible with other components, such as resistors and cross-overs, formed on the substrate.

Although the optimum $BaO:B_2O_3$ ratio is believed to be 86.86 to 13.14, the ratio can vary between 89% by weight $BaO:11\%$ by weight $B_2O_3$, to 85% by weight $BaO:15\%$ by weight $B_2O_3$ with good results. It was found that increasing the amount of BaO above 89% produced a glass which was to refractory, and reducing the BaO below 85% produced a glass which tended toward excess fluidity.

It should be recognized that the invention is not limited to the particular electrode formula utilized. Thus, the use of as much as 30% by weight of $BaO:B_2O_3$ in the electrode formula is possible without lowering the conductivity of the base electrode beyond an undesirable level. Satisfactory adherence characteristics can be attained with as little as 10% by weight $BaO:B_2O_3$.

The following are examples of test formulations in which $BaO:B_2O_3$ was utilized in the fabrication of thick film, high dielectric capacitors:

EXAMPLE I

A base electrode formulation of 30% by weight $BaO:B_2O_3$ was utilized in conjunction with the same noble metal ratios set forth in Table I. A ratio of 86.86% BaO to 13.14% $B_2O_3$ was utilized. The base electrode layer was prepared and deposited as described above. This layer was fired at about 2400°F for 1½ hours.

A dielectric layer was utilized of 70% by weight $BaTiO_3$ and 30% by weight $SrTiO_3$. The dielectric layer was deposited as described hereinbefore and fired at about 2350°F for 1½ hours. A top electrode of conventional low firing material was applied, as described above.

The capacitor produced with this formulation exhibited a dielectric constant, K of about 1800 which was significantly higher than expected.

EXAMPLE II

A base electrode formulation of 15% by weight $BaO:B_2O_3$ was utilized in conjunction with the same noble metal ratios set forth in Table I. A ratio of 86.86% BaO to 13.14% $B_2O_3$ was utilized. The base electrode layer was prepared and deposited as described above. The layer was fired at about 2400°F for 1½ hours.

A dielectric layer was utilized of the dielectric formulation set forth in Table II. The layer was deposited as described herein, and fired at about 2,200°F for 1½ hours. A top electrode of conventional low firing material was applied, as described above.

The capacitor produced with this formulation exhibited a dielectric constant, K of about 800, as compared with dielectric constants K of about 300 exhibited by capacitors formulated with silica containing base electrodes and the same dielectric material.

EXAMPLE III

A base electrode formulation of 15% by weight $BaO:B_2O_3$ was utilized in conjunction with the same noble metal ratios set forth in Table I. A ratio of 86.86% BaO to 13.14% $B_2O_3$ was utilized. The base electrode layer was prepared and deposited as described above. The layer was fired at about 2400°F for 1½ hours.

A dielectric layer was utilized of 74% by weight $Bi_2O_3$ and 26% by weight $TiO_2$. The layer was deposited as described above and fired at about 2010°F for 1½ hours. A top electrode of conventional low firing material was applied, as described above.

The capacitor produced with this formulation exhibited a dielectric constant K of about 150, as compared with dielectric constants, K of about 90–120 exhibited by capacitors formulated with silica containing base electrodes and the same dielectric material.

All of the $BaO:B_2O_3$ capacitors produced exhibited good substrate adherence qualities, and their other electrical characteristics were equal or superior to those of silica containing components.

Although the base electrode composition and method of application are particularly useful in the fabrication of thick film capacitors, it should be recognized that the base electrode has utility in other thick film components, such as resistors, as well.

What is claimed is:

1. An electrode material comprising a mixture of 70–90% by weight noble metals and 10–30% by weight $BaO:B_2O_3$ with a $BaO:B_2O_3$ ratio between 85% $BaO:15\%$ $B_2O_3$, by weight, and 89% $BaO:11\%$ $B_2O_3$, by weight.

2. The electrode material of claim 1 where the $BaO:B_2O_3$ ratio is about 86.86% BaO to 13.14% $B_2O_3$ by weight.

3. The electrode material of claim 1 where the mixture comprises about 85% by weight noble metals and about 15% by weight $BaO:B_2O_3$.

4. The electrode material of claim 1 where the mixture of noble metals includes platinum-23.80%, gold-35.70%, palladium-25.50%, and $BaO:B_2O_3$-15.00%.

5. The electrode material of claim 4 where the $BaO:B_2O_3$ ratio is about 86.86% BaO to 13.14% $B_2O_3$, by weight.

6. An electrode material especially adapted for use in production of thick film, high dielectric capacitors utilizing $BaTiO_3$ based dielectric materials comprising a mixture of 70–90% by weight noble metals and 10–30% by weight $BaO:B_2O_3$ with a $BaO:B_2O_3$ ratio between 85% $BaO:15\%$ $B_2O_3$, by weight, and 89% $BaO:11\%$ $B_2O_3$, by weight.

7. The electrode material of claim 6 where the mixture of noble metals includes platinum-23.80%, gold-35.70%, palladium-25.55%, and $BaO:B_2O_3$-15.00%.

* * * * *